United States Patent
Tingskov et al.

(10) Patent No.: US 11,043,836 B2
(45) Date of Patent: *Jun. 22, 2021

(54) UPS HAVING A DELTA CONVERTER UTILIZED AS INPUT POWER REGULATOR IN A DOUBLE CONVERSION SYSTEM

(71) Applicant: SCHNEIDER ELECTRIC IT CORPORATION, West Kingston, RI (US)

(72) Inventors: Carsten Nommensen Tingskov, Fredericia (DK); Jacob Damgaard Schmidt, Vejen (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 309 days.

This patent is subject to a terminal disclaimer.

(21) Appl. No.: 15/848,201

(22) Filed: Dec. 20, 2017

(65) Prior Publication Data
US 2018/0115187 A1    Apr. 26, 2018

Related U.S. Application Data

(63) Continuation of application No. 14/381,792, filed as application No. PCT/US2012/027050 on Feb. 29, 2012, now Pat. No. 9,859,749.

(51) Int. Cl.
*H02J 9/00*    (2006.01)
*H02J 9/06*    (2006.01)

(52) U.S. Cl.
CPC .    *H02J 9/00* (2013.01); *H02J 9/06* (2013.01)

(58) Field of Classification Search
CPC ........ H02J 9/00; H02J 3/00; H02J 1/02; H02J 7/00; H02M 5/40; H02M 5/458; H02M 1/10; G01N 27/416; G05F 1/40
(Continued)

(56) References Cited

U.S. PATENT DOCUMENTS 5,315,533 A * 5/1994 Stich ............... H02J 9/062
                                                    700/298
5,801,937 A * 9/1998 Gold ............... H02M 7/003
                                                    363/141

(Continued)

FOREIGN PATENT DOCUMENTS

CN    101926070 A    12/2010
TW    M391794 U     11/2010

OTHER PUBLICATIONS

"Understanding Delta Conversion Online "Power Regulation"— Part 2", American Power Conversion, www.apc.com, Application Note #40, Dec. 31, 2004 (Dec. 31, 2004), XP002744340, Retrieved from the Internet: URL:http://www.apcmedia.com/salestools/TDOY-5UQVD9/TDOY-5UQVD9_R1_EN.pdf?sdirect=true [retrieved on Sep. 10, 2015].

(Continued)

*Primary Examiner* — Nguyen Tran
*Assistant Examiner* — Jagdeep S Dhillon
(74) *Attorney, Agent, or Firm* — Lando & Anastasi, LLP

(57) ABSTRACT

An uninterruptible power supply includes a first power converter, a second power converter, and a DC-to-AC converter coupled to the first power converter and the second power converter. The first power converter includes a first AC-to-DC converter and a transformer having a primary winding coupled to the input and the output, and a secondary winding coupled to the first AC-to-DC converter. The first power converter is configured, during a first mode of operation of the UPS, to provide a first portion of the AC input power as the AC output power via the primary winding and convert a second portion of the AC input power into DC power via the first AC-to-DC converter. The second power converter includes a second AC-to-DC converter and is configured to convert the AC input power into DC power via (Continued)

the second AC-to-DC converter during a second mode of operation of the UPS.

20 Claims, 3 Drawing Sheets

(58) Field of Classification Search
USPC ..... 307/23, 66, 64, 17, 43, 80, 87; 324/426; 323/266, 286, 39, 44, 34
See application file for complete search history.

(56) References Cited

U.S. PATENT DOCUMENTS

| | | | |
|---|---|---|---|
| 6,213,199 B1 | 4/2001 | Al-Khateeb | |
| 6,218,744 B1 | 4/2001 | Zahrte, Sr. et al. | |
| 6,768,223 B2 * | 7/2004 | Powell | H02J 9/062 307/64 |
| 7,345,381 B2 * | 3/2008 | Harris | H02M 1/10 307/81 |
| 7,391,132 B2 * | 6/2008 | Chen | H02J 9/062 307/43 |
| 7,446,433 B2 | 11/2008 | Masciarelli et al. | |
| 7,881,079 B2 * | 2/2011 | Prasad | H02M 1/4208 363/39 |
| 8,575,779 B2 * | 11/2013 | Le | H01F 27/24 307/66 |
| 2002/0011752 A1 * | 1/2002 | Powell | H02J 9/062 307/64 |
| 2002/0071292 A1 | 6/2002 | Aihara et al. | |
| 2003/0043596 A1 | 3/2003 | Pai et al. | |
| 2004/0036361 A1 * | 2/2004 | Dai | H02J 9/062 307/64 |
| 2006/0119184 A1 | 6/2006 | Chen | |
| 2008/0013351 A1 | 1/2008 | Alexander | |
| 2008/0067872 A1 * | 3/2008 | Moth | H02J 9/062 307/23 |
| 2008/0238205 A1 * | 10/2008 | Lee | H02J 9/061 307/66 |
| 2009/0160254 A1 | 6/2009 | Wu et al. | |
| 2009/0189451 A1 * | 7/2009 | Roepke | G06F 1/30 307/66 |
| 2010/0181837 A1 | 7/2010 | Seeker et al. | |
| 2011/0273022 A1 | 11/2011 | Dennis et al. | |
| 2011/0305049 A1 | 12/2011 | Raptis et al. | |
| 2012/0091811 A1 * | 4/2012 | Heidenreich | H02J 9/062 307/65 |
| 2012/0217806 A1 * | 8/2012 | Heidenreich | B60L 58/22 307/48 |
| 2015/0008744 A1 * | 1/2015 | Navarro | H02J 9/00 307/64 |

OTHER PUBLICATIONS

Australian Patent Examination Report from corresponding Australian Patent Application No. 2012371654 dated Jun. 3, 2016.
Australian Patent Examination Report No. 2 from corresponding Australian Patent Application No. 2012371654 dated May 11, 2017.
Australian Patent Examination Report No. 3 from corresponding Australian Patent Application No. 2012371654 dated May 22, 2017.
Extended European Search Report from corresponding European Application No. 12870053.1 dated Sep. 25, 2015.
Notification of Transmittal of the International Search Report and the Written Opinion of the International Searching Authority from corresponding PCT/US2012/027050 dated Jan. 25, 2013.
Taiwan Search Report from corresponding Taiwan Application No. 102107226 dated Sep. 10, 2016.
Understanding Delta Conversion OnlineTM "The Difference"—Part 1 APC Application Note #39 [online]. American Power Conversion. 2004 [retrieved on Jun. 14, 2012]. Retrieved from the internet: <URL:http://www.apcmedia.com/salestools/TDOY-5UQVD8_R1_EN.pdf>. pp. 1-8.

* cited by examiner

UPS HAVING A DELTA CONVERTER UTILIZED AS INPUT POWER REGULATOR IN A DOUBLE CONVERSION SYSTEM

CROSS-REFERENCE TO RELATED APPLICATIONS

This application is a continuation of U.S. patent application Ser. No. 14/381,792 filed Feb. 29, 2012, titled UPS HAVING A DELTA CONVERTER UTILIZED AS INPUT POWER REGULATOR IN A DOUBLE CONVERSION SYSTEM, which is hereby incorporated herein by reference in its entirety. U.S. patent application Ser. No. 14/381,792 is a U.S. National Stage Application and claims priority under 35 U.S.C. § 371 from International Application No. PCT/US2012/027050, filed Feb. 29, 2012, titled UPS HAVING A DELTA CONVERTER UTILIZED AS INPUT POWER REGULATOR IN A DOUBLE CONVERSION SYSTEM, which is hereby incorporated herein by reference in its entirety.

BACKGROUND OF THE INVENTION

1. Field of Invention

Embodiments of the invention relate generally to operation of uninterruptible power supply systems.

2. Discussion of Related Art

An uninterruptible power supply (UPS) is typically used to provide backup power to an electrical device, or load, while the primary power source, or mains, is unavailable. A conventional online UPS rectifies input power provided by an electric utility using a power factor correction circuit (PFC) to provide a DC voltage to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is always powered either by mains or the battery, the output power of the UPS is uninterrupted if the mains fails and the battery is sufficiently charged. One such UPS is called an online UPS, and typically includes a double conversion topology.

To improve efficiency, some conventional UPS systems include bypass mechanisms that permit input power to flow past the power conversion circuitry (e.g., the double conversion topology) to the load during normal operating conditions (e.g., while AC mains is available and stable), switching to online mode only when necessary. Operating in bypass mode is more efficient than operating in online (i.e., double conversion) mode because the power conversion circuitry consumes power due to losses even when it is not needed for powering the load. However, one drawback of this approach is that, while operating in bypass mode, the load is susceptible to voltage variations and fast electrical transients in the mains because the power conversion circuitry performs some degree of line conditioning. Therefore, it is preferable to route power through the converter at all times despite the power losses associated with operating in online mode.

SUMMARY OF THE INVENTION

According to one embodiment, an uninterruptible power supply includes a first power converter, a second power converter, and a DC-to-AC converter coupled to the first power converter and the second power converter. The first power converter includes a first AC-to-DC converter and a transformer having a primary winding coupled to the input and the output, and a secondary winding coupled to the first AC-to-DC converter. The first power converter is configured, during a first mode of operation of the UPS, to provide a first portion of the AC input power as the AC output power via the primary winding and convert a second portion of the AC input power into DC power via the first AC-to-DC converter. The second power converter includes a second AC-to-DC converter and is configured to convert the AC input power into DC power via the second AC-to-DC converter during a second mode of operation of the UPS.

In one embodiment, the first power converter may include at least a portion of a delta conversion topology, and wherein the second power converter includes at least a portion of a double conversion topology. In another embodiment, the predefined operating range may be a first predefined operating range. The controller may be further configured to determine whether the AC input power is within a second predefined operating range that is different than the first predefined operating range, and, in response thereto, operate the UPS in the second mode of operation. In yet another embodiment, the controller may be further configured to determine whether the AC input power is outside of both of the first predefined operating range and the second predefined operating range, and, in response thereto, operate the UPS in a backup mode of operation in which the AC output power is derived from the DC power source. In one embodiment, the first predefined operating range may include voltages between approximately 97% and 103% of a predetermined nominal service voltage, and the second predefined operating range may include voltages between approximately 85% and 97% of the nominal service voltage and between approximately 103% and 115% of the nominal service voltage. In another embodiment, the first predefined operating range and/or the second predefined operating range may include multiple different voltages and/or voltage ranges.

In one embodiment, the UPS may include a switch interposed between the input and primary winding of the transformer. The controller may be configured to close the switch in the first mode of operation and open the switch in the second mode of operation.

In one embodiment, the UPS may include a charger coupled to the first power converter, the second power converter, and the DC power source. The DC power source may include a battery, fuel cell and/or other type of DC power supply.

In one embodiment, during the first mode of operation, the controller may be further configured to regulate the AC output power by adjusting a current across the secondary winding of the transformer using the first power converter. In another embodiment, during the first mode of operation, the controller may be further configured to provide DC power to the charger using the second power converter.

According to one embodiment, an uninterruptible power supply (UPS) includes an input configured to receive AC input power from an AC power source, an output configured to provide AC output power to a load, a DC power bus, a DC-to-AC converter coupled to the output and the DC power bus, a controller configured to determine whether the AC input power is within a predefined operating range, and, in response thereto, operate the UPS in a first mode of operation, otherwise, operate the UPS in a second mode of operation, and means coupled to the controller, the input, the output, the DC-to-AC converter and the DC power bus for converting the AC input power into the AC output power during the first mode of operation and converting the AC input power into DC power at the DC power bus during the second mode of operation.

In one embodiment, the means may include at least a portion of a delta conversion topology and at least a portion of a double conversion topology. In another embodiment, the predefined operating range may be a first predefined operating range. The controller may be further configured to determine whether the AC input power is within a second predefined operating range that is different than the first predefined operating range, and, in response thereto, operate the UPS in the second mode of operation. In yet another embodiment, the controller may be configured to determine whether the AC input power is outside of both of the first predefined operating range and the second predefined operating range, and, in response thereto, operate the UPS in a backup mode of operation in which the AC output power is derived from the DC power bus.

According to one embodiment, an uninterruptible power supply (UPS) includes an input configured to receive an AC input power from an AC power source, an output configured to provide an AC output power to a load, a DC power source, a first power converter coupled to the input and the DC power source, a second power converter coupled to the input and the DC power source, the first power converter including a first AC-to-DC converter and a transformer, the transformer having a primary winding coupled across the input and the output, the transformer further having a secondary winding coupled to the first AC-to-DC converter, the second power converter including a second AC-to-DC converter. A method of operating the UPS includes determining whether the AC input power is within a predefined operating range, operating the UPS in a first mode of operation in response to determining that the AC input power is within the predefined operating range, converting, during the first mode of operation, a first portion of the AC input power into the AC output power via the primary winding of the transformer, converting, during the first mode of operation, a second portion of the AC input power that is different than the first portion of the AC input power into DC power via the first AC-to-DC converter, and converting, during the second mode of operation, the AC input power into DC power via the second AC-to-DC converter.

In one embodiment, the method may include determining whether the AC input power is within a second predefined operating range that is different than the first predefined operating range, and, operating the UPS in the second mode of operation in response to determining that the AC input power is within the second predefined operating range. In another embodiment, the first predefined operating range may include voltages between approximately 97% and 103% of a predefined nominal service voltage, and the second predefined operating range may include voltages between approximately 85% and 97% of the nominal service voltage and between approximately 103% and 115% of the nominal service voltage.

In one embodiment, the method may include coupling the primary winding of the transformer to the input during the first mode of operation and decoupling the primary winding of the transformer from the input during the second mode of operation. In another embodiment, the method may include regulating, during the first mode of operation, the AC output power by adjusting a current across the secondary winding of the transformer using the first power converter. In yet another embodiment, the method may include generating DC power using the second power converter during the first mode of operation. In yet another embodiment, the method may include detecting a loss of the AC input power, and, in response thereto, operating the UPS in a backup mode of operation in which the AC output power is derived from the DC power source.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
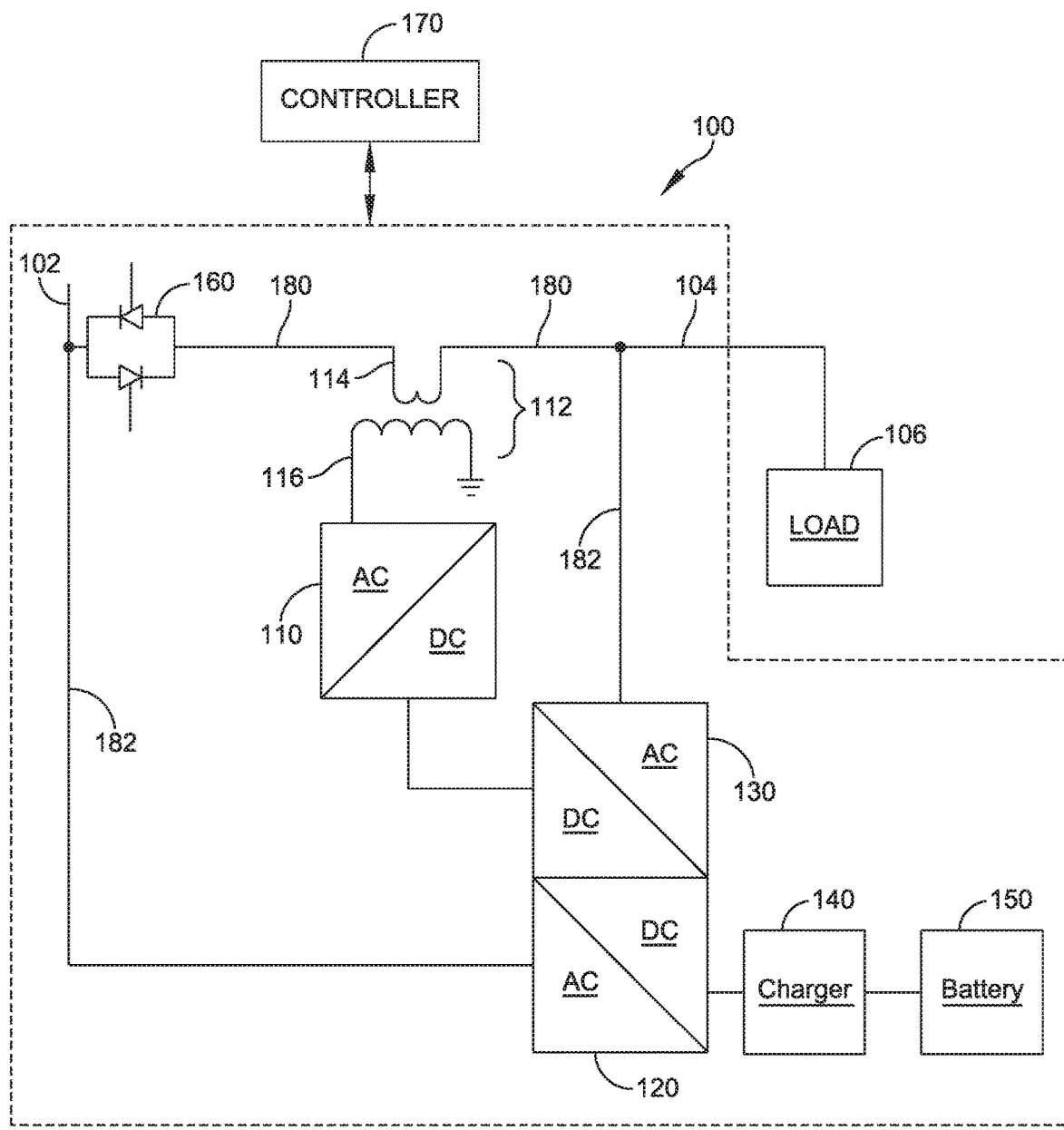
FIG. 1 is a block diagram of one example of an uninterruptible power supply in accordance with one embodiment.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments relate to power conversion in a UPS; however, embodiments of the invention are not limited for use in uninterruptible power supplies and may be used with other power supplies or other power systems generally. Further, while at least some examples below describe uses with respect to online UPS's, some embodiments can be used with other types of UPS's.

Several different power conversion topologies are used in conventional uninterruptible power supplies. Most commonly used is a double conversion topology, also known as an online UPS, in which a battery is always connected to the inverter (i.e., a DC-to-AC converter) so that no power transfer switches are necessary. When a loss of input power (e.g., AC mains) occurs, the PFC (e.g., an AC-to-DC converter) drops out of the circuit and the battery continues to supply power to the load. When input power is restored, the PFC resumes carrying the load and may also begin charging the batteries. In online mode, the input power thus always flows through both the PFC and the inverter. As a result, some power is lost due to resistance and other inefficiencies inherent in the power conversion circuit. As discussed above, to improve efficiency, some double conversion circuits utilize bypass switches to bypass the PFC and inverter rather than operating in a conventional online mode. However, because the double conversion circuitry provides some degree of line conditioning, the load is not protected from surges or other transients in the input power while operating in bypass mode.

Another power conversion topology is called the delta conversion topology. Such a topology is used, for example, in the Symmetra® MW model of UPS's sold by American Power Conversion Corporation of West Kingston, R.I., the assignee of the present application. The delta conversion topology is similar to the double conversion topology, except that the PFC and inverter are configured as bidirectional devices (i.e., each converts power from AC to DC and from DC to AC), as opposed to being configured as unidirectional devices, such as in the double conversion configuration. Further, in three-phase systems, the delta conversion topology includes three single-phase isolation transformers, one for each phase, coupled to the input-side PFC/inverter. In online mode, mains input power flows through the transformers, and the delta converter is used to regulate the input current as well as to provide DC power for charging the battery. In backup mode, the load is supported by the battery through the inverter, as in the double-conversion configuration. One benefit of the delta conversion topology is that there are fewer losses incurred during online mode because the transformers are inherently more efficient than the PFC-inverter circuit in the double conversion circuit. Another benefit, as in double conversion, is that no transfer switches are required. However, the transformers, especially when sized for high power applications, are bulky and expensive to manufacture, which makes the delta conversion topology less appropriate for low- to medium-power applications (e.g., home or office).

According to one embodiment, a UPS utilizes a combination of double conversion and delta converter topologies, with some shared components. While the UPS is operating in online mode, the delta converter portion of the power conversion circuitry is primarily used to carry power from the mains input to the load, which, as discussed above, permits more efficient operation than achieved in a conventional double-conversion configuration. The transformers of the delta conversion portion are dimensioned for a relatively narrow range, or window, of input voltage variations (e.g., up to approximately three percent deviation from nominal voltage), and are therefore less bulky and expensive to manufacture than those used in conventional delta conversion UPS's.

Because the delta conversion portion is dimensioned narrowly, larger variations in the input power cannot be handled adequately by the delta conversion portion. Thus, while the input power falls outside of the above-described operating window for the delta conversion portion, the UPS switches from delta conversion to double conversion to power the load. Because the UPS operates in either double conversion or delta conversion modes when the AC mains is available, the UPS is always providing line regulation and conditioned power to the load, unlike in bypass mode of a conventional UPS, as discussed above.

FIG. 1 is a block diagram of an example of a UPS system 100, according to one embodiment. The UPS system 100 is configured to be coupled to an AC power source via an AC input 102. The UPS system 100 is further configured to convert AC input power at the AC input 102 into AC output power at an output 104. A load 106, which is not necessarily part of the UPS 100, may be coupled to the output 104.

As discussed above, various embodiments include a combination of double conversion and delta conversion topologies. The UPS 100 shown in FIG. 1 includes a first power converter 110, also referred to as a delta converter, coupled to a transformer 112. The transformer has a primary winding 114 coupled at a first end to the AC input 102 and at a second end to the AC output 104. The transformer also has a secondary winding 116 coupled at a first end to the delta converter 110 and at a second end to a reference voltage (e.g., ground). The UPS 100 further includes a second power converter 120, also referred to as a PFC, coupled to the input 102. The delta converter 110 and the PFC 120 each include separate AC-to-DC converters. The UPS 100 further includes an inverter 130, also referred to a DC-to-AC converter, coupled to each of the delta converter 110 and the PFC 120. A DC power bus (not shown) may optionally be coupled between a DC output of the delta converter 110, a DC output of the PFC 120, and a DC input of the inverter 130. An AC output of the inverter 130 is coupled to the output 104. The UPS 100 may include a battery charger 140 (e.g., configured as a buck converter) coupled to the DC power bus, and a battery 150 coupled to the battery charger 140. The UPS 100 may further include a mains switch 160 coupled at a first end to the AC input 102 and at a second end to the primary winding 114 of the transformer 112, and a controller 170 operationally coupled to one or more other elements of the UPS 100, including the mains switch 160.

In one embodiment, the UPS 100 is configured to operate in at least two modes while AC input power (i.e., utility or mains power) is available at the AC input 102. In a first mode of operation, the delta converter 110 is enabled and the PFC 120 is disabled. Input power flows from the AC input 102 to the AC output 104 along path 180 via the primary winding 114 of the transformer 112. The delta converter 110 may, for example, be enabled when the mains switch 160 is closed, which connects the AC input 102 to the delta converter 110. The delta converter 110 may be disabled when the mains switch 160 is open, which disconnects the AC input 102 from the delta converter 110. It will be understood that other techniques for enabling and disabling the delta converter 110 may be utilized.

In a second mode of operation, the delta converter 110 is disabled and the PFC 120 is enabled. Input power flows from the AC input 102 to the AC output 104 along path 182 via the PFC 120 and the inverter 130. Accordingly, in either the first or second modes of operation, AC input power at the AC input 102 is provided to the output 104 via either the delta converter 110 or the PFC 120, respectively.

The delta converter 110, when enabled, is configured to regulate the AC output power by adjusting a voltage across and/or a current through the secondary winding 116 of the transformer 112. In one embodiment, the transformer 112 has a voltage ratio of approximately 1:5 (primary winding 114 to secondary winding 116) or, stated differently, a 5:1 current ratio. Because the power imported from the AC input 102 is approximately equal to the load power plus any losses, the current passing through the primary winding 114 will therefore be five times greater than the current passing through the secondary winding 116. Consequently, the primary winding 114 appears to the load 106 as a variable impedance to the flow of power through the UPS 100. Accordingly, the AC output power of the UPS 100 can be controlled by controlling the operation of the delta converter 110 (e.g., the delta converter 110 may be a current controlled IGBT pulse width modulated inverter controlled by the controller 170). By regulating the AC output power in this manner, power is delivered from the AC input 102 to the AC output 104 via primary winding 114 of the transformer 112. This enables the UPS 100 to operate more efficiently than a conventional double conversion UPS.

In addition to regulating the AC output power, the delta converter 110, in conjunction with the inverter 130, may be configured to provide DC power to the charger 140 while AC input power at the AC input 102 is available and while the delta converter 110 is enabled.

As discussed above, in conventional UPS's utilizing a delta conversion topology, the transformer is bulky and expensive to manufacture, at least because such UPS's are typically dimensioned for high power applications. According to one embodiment, the transformer 112 of the UPS 100 is dimensioned smaller than in conventional applications to reduce size, weight and manufacturing cost. As a consequence, the delta converter 110 is not as capable of processing AC input voltages that deviate too far from a stable or other nominal voltage as the PFC 120 is. Therefore, the UPS 100 is configured to detect when the AC input voltage is outside of a range around a predefined nominal voltage, and, in response thereto, switch from the first mode of operation (i.e., delta conversion mode) to the second mode of operation (i.e., double conversion mode).

Figure 2:
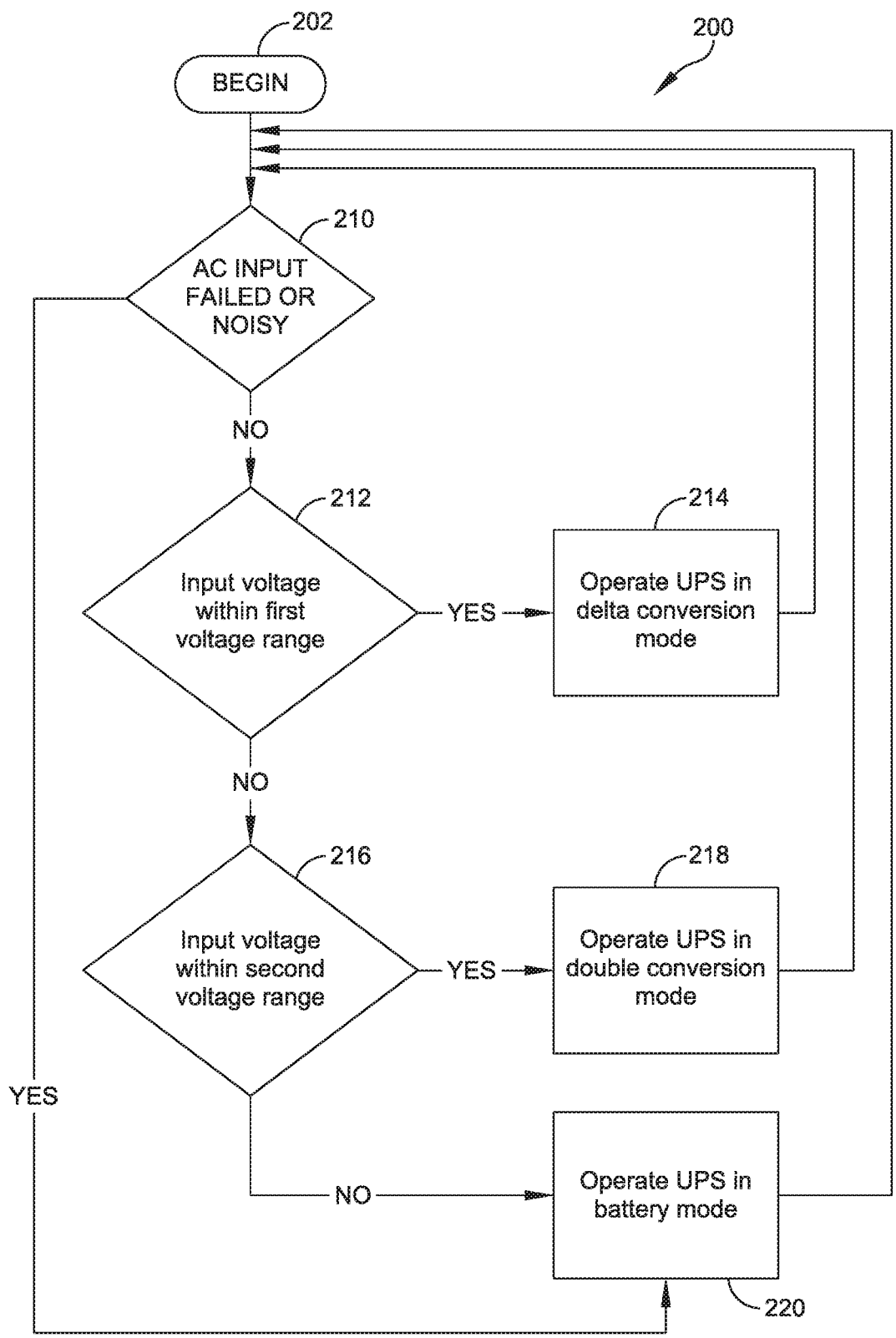
FIG. 2 is a flow diagram of one example of a process for operating an uninterruptible power supply in accordance with one embodiment.

FIG. 2 is a flow diagram illustrating a process 200 for controlling the UPS 100 of FIG. 1, according to one embodiment. Process 200 begins at block 202. At block 210, the AC input voltage (e.g., an instantaneous voltage) is measured. If the AC input has failed (e.g., no voltage is measured at the AC input) or if the AC input voltage is noisy or irregular, the UPS operates in battery mode 220. Otherwise, process 200 proceeds to block 212. At block 212, if the measured AC input voltage is within a first range of voltages, the UPS operates in the first mode of operation 214 (i.e., delta conversion mode). The first range of voltages may, for example, include voltages within +/−3% of a predefined nominal voltage. In at least one embodiment, the predetermined nominal voltage is a voltage defined by ANSI C84.1-1989, although it will be understood that any predefined nominal voltage may be used (e.g., 120 VAC, 220 VAC, 480 VAC, etc.), and may include the nominal voltage supplied by a utility provider.

If, on the other hand, the measured AC input voltage is not within the first range of voltages, process 200 proceeds to block 216. At block 216, if the measured AC input voltage is within a second range of voltages (block 216), the UPS operates in the second mode of operation 218 (i.e., double conversion mode). The second range of voltages may, for example, voltages within +/−15% of the predefined nominal voltage. In this embodiment, the PFC 120 of the UPS 100 of FIG. 1 is configured to process all input voltages within the second range of voltages.

However, if the AC input voltage is within neither the first nor the second range of voltages, the UPS switches to battery mode (block 220), wherein the load 106 is powered from the battery 150 rather than from the AC input 102. This condition may occur, for example, when the AC input power has failed or is highly irregular or noisy.

Process 200 may, for example, repeat indefinitely. In other words, while the UPS is operating in the first mode of operation 214, the second mode of operation 218 and/or battery mode 220, the AC input voltage may be measured for any conditions that may cause the UPS to switch to a different mode of operation, such as described above.

In one embodiment, the UPS 100 can switch from the first mode of operation 214 to the second mode of operation 218, and/or from the second mode to the first mode, nearly instantaneously, such that the switchover is practically invisible to the load 106. In another embodiment, the UPS 100 can switch from the first and/or second modes of operation 214, 218 to battery mode 220 (e.g., when the AC input power has failed), and/or from battery mode 220 to the first and/or second modes of operation 214, 218 (e.g., when the AC input power has been restored), nearly instantaneously, such that the switchover is practically invisible to the load 106.

Figure 3:
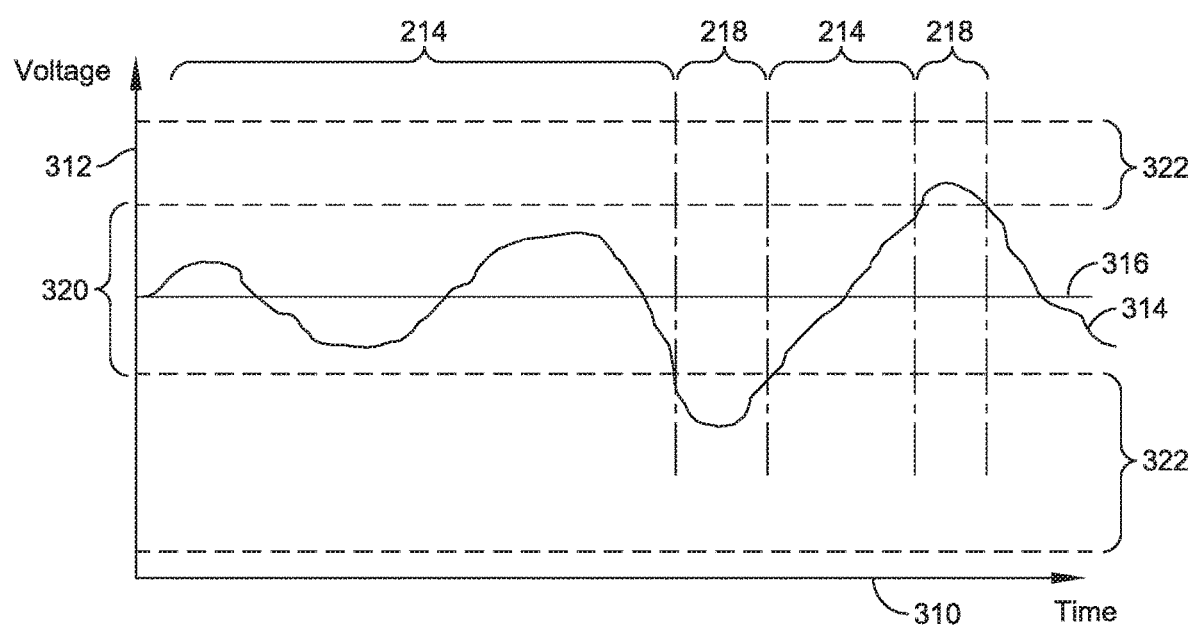
FIG. 3 is a graph showing one exemplary relationship between an input voltage and an operation of an uninterruptible power supply in accordance with one embodiment.

FIG. 3 is a not-drawn-to-scale graph that, as an example, further illustrates the operating modes described above with respect to FIG. 2, according to one embodiment. The horizontal axis 310 represents time, increasing from left to right, and the vertical axis 312 represents a magnitude of a voltage (e.g., an RMS voltage) at the AC input 102, increasing from bottom to top. An exemplary input voltage, which varies over time (e.g., seconds, minutes, hours, days, etc.), is represented by line 314, and an exemplary nominal voltage is represented by line 316. The UPS 100 can stabilize the input voltage at all times to create a stabilized output voltage (not shown, but substantially similar to the nominal input voltage), using power regulating techniques such as those discussed above with respect to the delta and double conversion topologies.

The first range of voltages 320 is a range of voltages about the nominal voltage 316, and the second range of voltages 322 includes voltages outside of the first range of voltages. In some embodiments, the first range of voltages 320 are relatively narrow compared to the second range of voltages 322, such as described above with respect to FIG. 2. As can be seen in FIG. 3, and according to the process 200 described above with respect to FIG. 2, while the input voltage 314 falls within the first range of voltages 320, the UPS 100 operates in the first mode of operation 214 (i.e., delta conversion mode). Furthermore, while the input voltage 314 falls within the second range of voltages 322, the UPS 100 operates in the second mode of operation 218 (i.e., double conversion mode).

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays or switches. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In at least one embodiment, the UPS may be configured as a modular UPS system, such as described in U.S. Pat. No. 7,446,433 to Masciarelli et al. For example, in one embodiment, the UPS system may be configured as a modular system having a DC bus, battery bus and/or DC interlink bus connection such that the UPS module can be plugged into and operated as a part of a larger UPS system. In one such embodiment, the UPS module may not necessarily include a charger, a battery or an inverter, as one or more of these may be provided by the larger UPS system.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series internal or external to a UPS.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. For example, each UPS subsystem may include conventional PFC converter topologies. This may enable the UPS system to achieve high efficiency at a low cost. In another example, the power ratings of each UPS subsystem may be different than those described herein, thereby providing different total output power and different levels of redundancy for a given configuration of the UPS system. Accordingly, the foregoing description and drawings are by way of example only.

What is claimed is:

1. An uninterruptible power supply (UPS), comprising:
    an input configured to receive AC input power from an AC power source;
    an output configured to provide AC output power to a load;
    a DC power bus;
    a DC-to-AC converter coupled to the output and the DC power bus;
    a controller configured to determine whether the AC input power is within one of a first predefined operating range and a second predefined operating range, operate, in response to a determination that the AC input power is within the first predefined operating range, the UPS in a first mode of operation, and operate, in response to a determination that the AC input power is within the second predefined operating range, the UPS in a second mode of operation; and
    means coupled to the controller, the input, the output, the DC-to-AC converter and the DC power bus for converting the AC input power into the AC output power during the first mode of operation and converting the AC input power into DC power at the DC power bus and the DC power from the DC power bus into the AC output power during the second mode of operation,
    wherein the first predefined operating range corresponds to a first range of voltages including voltages above and below a predefined nominal voltage of the AC input power and the second predefined operating range corresponds to a second range of voltages including voltages above and below the first range of voltages.

2. The UPS of claim 1, wherein the means includes at least a portion of a delta conversion topology and at least a portion of a double conversion topology.

3. The UPS of claim 2, wherein the second predefined operating range is different than the first predefined operating range.

4. The UPS of claim 2, wherein the controller is configured to determine whether the AC input power is outside of both of the first predefined operating range and the second predefined operating range, and, in response thereto, operate the UPS in a backup mode of operation in which the AC output power is derived from the DC power bus.

5. The UPS of claim 4, wherein the first range of voltages of the first predefined operating range includes voltages between approximately 97% and 103% of the predefined nominal voltage, and wherein the second range of voltages of the second predefined operating range includes voltages between approximately 85% and 97% of the predefined nominal voltage and between approximately 103% and 115% of the predefined nominal voltage.

6. The UPS of claim 2, further comprising a switch interposed between the input and the portion of the delta conversion topology, wherein the controller is further configured to close the switch in the first mode of operation and open the switch in the second mode of operation.

7. The UPS of claim 2, further comprising a charger coupled to the means and configured to be coupled to a battery.

8. The UPS of claim 7, wherein, during the first mode of operation, the controller is further configured to operate the means to provide DC power to the charger and the charger is configured to charge the battery.

9. The UPS of claim 2, wherein, during the first mode of operation, the controller is further configured to regulate the AC output power by adjusting a current through the portion of the delta conversion topology.

10. A method of operating an uninterruptible power supply (UPS) having an input configured to receive an AC input power from an AC power source, an output configured to provide an AC output power to a load, a first portion coupled to the input and a DC power source that is configured in a delta conversion topology, a second portion coupled to the input and the DC power source that is configured in a double conversion topology, the method comprising:
    determining whether the AC input power is within one of a first predefined operating range and a second predefined operating range, the first predefined operating range corresponding to a first range of voltages including voltages above and below a predefined nominal voltage of the AC input power and the second predefined operating range corresponding to a second range of voltages including voltages above and below the first range of voltages;
    operating the UPS in a first mode of operation in response to determining that the AC input power is within the first predefined operating range;
    converting, in the first mode of operation with the first portion, the AC input power into the AC output power and into DC power;
    operating the UPS in a second mode of operation in response to determining that the AC input power is within the second predefined operating range;
    converting, in the second mode of operation with the second portion, the AC input power into DC power and the DC power into the AC output power.

11. The method of claim 10, wherein the first range of voltages of the first predefined operating range includes voltages between approximately 97% and 103% of the predefined nominal voltage, and wherein the second range of voltages of the second predefined operating range includes voltages between approximately 85% and 97% of the predefined nominal voltage and between approximately 103% and 115% of the predefined nominal voltage.

12. The method of claim 10, further comprising coupling the first portion to the input during the first mode of operation and decoupling the first portion from the input during the second mode of operation.

13. The method of claim 10, further comprising regulating, during the first mode of operation, the AC output power by adjusting a current through the first portion.

14. The method of claim 10, further comprising detecting a loss of the AC input power, and, in response thereto, operating the UPS in a backup mode of operation in which the AC output power is derived from a DC power source.

15. The method of claim 14, further comprising providing, in the first and second modes of operation, the DC power to a charger configured to charge the DC power source.

16. An uninterruptible power supply (UPS), comprising:
an input configured to receive AC input power from an AC power source;
an output configured to provide AC output power to a load;
a DC power bus;
a first portion coupled to the input and the DC power bus and configured in a delta conversion topology;
a second portion coupled to the input and the DC power bus and configured in a double conversion topology; and
a controller configured to:
determine whether the AC input power is within one of a first predefined operating range and a second predefined operating range, the first predefined operating range corresponding to a first range of voltages including voltages above and below a predefined nominal voltage of the AC input power and the second predefined operating range corresponding to a second range of voltages including voltages above and below the first range of voltages;
operate the UPS in a first mode of operation in response to determining that the AC input power is within the first predefined operating range;
operate the first portion in the first mode of operation to convert the AC input power into the AC output power and into DC power at the DC power bus;
operate the UPS in a second mode of operation in response to determining that the AC input power is within the second predefined operating range; and
operate the second portion in the second mode of operation to convert the AC input power into DC power at the DC power bus and the DC power from the DC power bus into the AC output power.

17. The UPS of claim 16, wherein the first range of voltages of the first predefined operating range includes voltages between approximately 97% and 103% of the predefined nominal voltage, and wherein the second range of voltages of the second predefined operating range includes voltages between approximately 85% and 97% of the predefined nominal voltage and between approximately 103% and 115% of the predefined nominal voltage.

18. The UPS of claim 16, wherein the controller is further configured to determine whether the AC input power is outside of both of the first predefined operating range and the second predefined operating range, and, in response thereto, operate the UPS in a backup mode of operation in which the AC output power is derived from the DC power bus.

19. The UPS of claim 16, further a switch interposed between the input and the first portion, wherein the controller is further configured to close the switch in the first mode of operation and open the switch in the second mode of operation.

20. The UPS of claim 16, further comprising a charger coupled to the DC power bus and configured to be coupled to a DC power source and to charge, in the first mode of operation and the second mode of operation, the DC power source with DC power from the DC power bus.

* * * * *